Patented Feb. 13, 1945

2,369,429

UNITED STATES PATENT OFFICE 2,369,429

INSECTICIDE COMPOSITION

Clifford J. Boissonou, Concord, Calif., assignor to Shell Development Company, San Francisco, Calif., a corporation of Delaware No Drawing. Application June 30, 1942, Serial No. 449,156

9 Claims. (Cl. 167—42)

This invention relates to a new and improved insecticidal liquid comprising a spray oil in water emulsion. More particularly, it pertains to an additive for such a composition, which additive is an agent for improving the deposition of the spray oil from the aqueous emulsion as well as for improving the dispersity of the spray oil in the water.

Insecticidal compositions have long been used and applied to foliage, fruit and/or plants as liquid or vapor sprays. The effectiveness of an insecticide spray depends upon the even distribution of the spray oil on and adherence of the spray oil to the object sprayed. In effecting this distribution the spray oil is often dispersed in a liquid carrier such as water. In actual practice much of the liquid carrier runs off the foliage carrying with it considerable quantities of the spray oil which are thus lost. It is therefore important to minimize the carrying-off of the spray oil and to increase its deposition from the carrier liquid. Accordingly, if the deposition of the spray oil from the aqueous emulsion is increased, lower concentration of the spray oil may be used to obtain the same previous lethal effect. Hence a substantial economic saving is accomplished.

A primary object of this invention is to produce an effective, practical and economical insecticidal composition. Another object is to provide an additive for insecticidal compositions capable of causing increased deposits and adherence of toxic ingredients when they are sprayed in the form of an aqueous emulsion on foliage, fruits or dormant plants. A further object is to provide an additive which is not only a depositing agent but is also an emulsifying agent, thereby increasing the dispersity of the spray oil in its aqueous carrier.

The insecticidal composition of this invention comprises a spray oil containing the active material for repelling or killing harmful pests, a small amount of a depositing agent, and an aqueous carrier to aid in the distribution of said active material. In addition other ingredients may be present, including emulsifying agents to disperse the spray oil in the aqueous carrier, depositing agents to aid the adherence of the spray oil to the object sprayed, anti-penetrants to prevent the spray oil from entering the pores and injuring the plant on which it is sprayed, spreading agents to distribute the spray oil over the plant sprayed, etc.

The spray oil comprises a mineral oil either with or without the addition of repellents or insecticides. Mineral oils desirable for insecticide compositions are in particular light, refined, lubricating oils having an S. U. V. at 100° F. of between about 30 and 120 seconds, preferably between about 40 and 70 seconds, and having an unsulfonated residue preferably above about 70%.

The mineral oil may act as the insecticide itself or specific repellents or insecticides may be added to it such as pyrethrum, rotenone, derris resins, nicotine, aliphatic thiocyanates, nitrocresols, nitrophenols, cresylic acids, alkyl amines, pine oils, halogenated hydrocarbons such as chlorinated naphthalenes, etc.

The depositing agents of this invention comprise esters which are at least slightly soluble in both the spray oil and water. Suitable esters are carboxylic acid esters of tri- and tetra-hydroxy alcohols having a neo-carbon atom wherein at least one and preferably two or more of the hydroxy radicals are esterified. A neo-carbon atom is one that is attached directly to four other carbon atoms.

Alcohols containing a neo-carbon atom are represented by the formula:

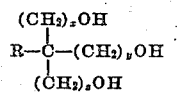

wherein $x$, $y$ and $z$ are integers preferably one (1), and R is a hydrocarbon radical which may be aliphatic, alicyclic or aromatic and may comprise groups such as methyl, ethyl, propyl, isopropyl, butyl, amyl, hexyl and higher alkyl groups; cyclohexyl, methyl cyclohexyl, and other alkyl cyclohexyl and di- and poly-alicyclic radicals, such as may be obtained by hydrogenation of alkyl phenols, alkyl naphthols or of cyclic polymerization products of acetone, methyl ethyl ketone, mesityl oxide, etc.; phenyl, naphthyl and their alkyl derivatives, such as methyl phenyl, ethyl phenyl, methyl naphthyl, etc. The hydrocarbon radicals may contain preferably not more than one polar substitution group, in particular, hydroxyl such as methanol, ethanol, propanol, etc., carboxyl, ether, thioether, halide, and nitro radicals as well as heterocyclic compounds of an aromatic nature consisting of one oxygen, sulfur or nitrogen atom in a five or six membered ring, such as furan, thiophene, pyridine, quinoline, etc. A preferred group of such compounds are those in which R is a hydroxyl substituted hydrocarbon or carbinol group, such as in penta-erythritol $C(CH_2OH)_4$.

These alcohols may be prepared by reacting hydrocarbon trihalogen of the general formula R—C—Hal$_3$ with silver or potassium cyanides to form a nitrile R—C—(C≡N)$_3$, hydrogenating the nitrile to the amine and converting the amine to the corresponding alcohol by treating the former with nitrous acid. Two alcohols, penta-erythritol and 2-beta,beta',beta''-tertiary trihydroxy butyl pyridine are readily and cheaply prepared by the specific reaction of acetaldehyde and pyridine aldehyde respectively with formaldehyde in the presence of lime. This reaction is however not applicable generally.

Polyhydroxy alcohols of the above types are normally insoluble in mineral oils. It is therefore necessary to esterify these alcohols with carboxylic acids of sufficient carbon atoms to impart solubility in the spray oil. Acids suitable for this purpose are carboxylic acids having 7 or more carbon atoms per molecule, and preferably between 12 and 24 carbon atoms. These acids may be saturated or unsaturated aliphatic or cycloaliphatic carboxylic acids preferably having not more than one olefinic double bond, such as wool fats and fatty acids, e. g., lauric, myristic, palmitic, stearic, arachidic, eicosane-carboxylic, behenic, oleic, erucic, etc.; petroleum naphthenic acids; aromatic acids such as alkyl benzoic, alkyl benzyl acetic, phenyl acetic, phenyl stearic, alkyl pyridine carboxylic acids, etc. The saturated fatty acids are preferred in general.

Some specific examples of the esters derived from the above-mentioned alcohols and acids which may be employed as depositing agents are penta-erythritol distearate, penta-erythritol tetrastearate, and di- and tri-fatty acid esters of 2-methyl,2-methylol-propane-1,3-diol; 2-chloromethyl,2-methylol-propane-1,3-diol; 3-methyl-2,2-dimethylol-butanol-1; 2-nitro,2-methylol-propane-1,3-diol; 2-beta,beta',beta''-trihydroxy-tertiary butyl pyridine; and 2,2'-dimethylol-3-hydroxy normal propyl benzene.

The amount of such esters necessary to be effective in an insecticidal composition usually ranges from about .01% to 2% by volume of the insecticidal material therein. However, this amount may vary somewhat depending upon the particular ester chosen and its relation to the other ingredients of the insecticidal composition, sometimes being larger or smaller than the above mentioned range. A preferred amount for several specific depositing agents has been found to be between about .2% and 1.0% by volume.

These esters may be added to either the spray oil or to the water used in making up the composition, whichever is the more convenient. It is preferable, however, to add them to the spray oil.

It is often desirable to employ a mutual solvent for the depositing agent and the spray oil in order to facilitate dispersion of the depositing agent in the insecticidal composition. Some such mutual solvents are phenol; alkyl phenols such as cresylic acid; certain ethers, particularly cellosolves and carbitols like mono- and di-ethylene glycol monobutyl ethers; alcohols such as butanols, pentanols, hexanols, cyclohexanol; ketones such as methyl ethyl ketone, di-isopropyl ketone, di-isobutyl ketone; etc. Amounts less than 5% by volume are normally sufficient, but less than 1% by volume being preferred if sufficient, because relatively large quantities tend to break the emulsion of the spray oil and water.

If a stable dispersion of the spray oil in water is desired, the addition of further emulsifying agents may be required, such as alkyl sulfonates and sulfates, including oil-soluble sodium, potassium or ammonium salts of petroleum sulfonic acids; fatty and naphthenic acid soaps; polymerized animal and vegetable oils; non-ionic emulsifiers such as vegetable and animal waxes and tallows. It is necessary that these emulsifying agents do not react with the ingredients in the insecticidal material. However, since the particular depositing agents of this invention also act as emulsifying agents, it is not always necessary to add these additional emulsifying agents to effect proper dispersion.

In order to save shipping cost the insecticide composition is usually shipped to place of use without the aqueous carrier, the latter being added in the field. Emulsification may be effected by any conventional means of agitation including circulation through the spraying machine in the field. The amount of water employed varies depending upon whether the insecticidal composition is to be used as a summer spray for foliage, or as a winter dormant spray. In a summer spray the amount of water usually varies between 96% and 99% by volume of the insecticidal composition, while in a dormant spray as little as 94% water may be used.

The insecticidal composition of this invention which contains the particular depositing and emulsifying agent described herein may also contain other additives such as anti-penetrants like aluminum naphthenate and Visco resins in the oil phase, as well as spreading agents in the oil or water phase such as blood, albumen, lecithin, and/or other known depositing agents.

The following examples demonstrate the effectiveness of the depositing agents of this invention.

Five samples of insecticidal compositions were prepared, one of which contained no depositing agents and was used as a standard. The spray oil employed in each was a light medium mineral oil having a Saybolt Universal viscosity at 100° F. of 68 seconds and an unsulfonated residue of 92%. Water emulsions were produced with each sample containing 1.67% by volume of the oil. The emulsification was effected by circulating the sample through a small field-type spraying machine under a pressure of 500 lbs. per sq. in. for a period of 30 seconds. This emulsion was then sprayed at this pressure through a nozzle having an orifice diameter of $\frac{5}{64}$ inch on to a rotating four-ounce sample bottle 6 feet away from the orifice for a period of 6 seconds. The sample bottle had been previously coated with beeswax to simulate the surface of fruit and foliage and accurately weighed. After spraying, the bottles were dried in a current of dust-free dye air to evaporate all the water thereon and then weighed. Each sample was sprayed on to three bottles and the average differences in weights before and after spraying were then calculated to the nearest microgram. The ratio between the weight deposited for each sample and the weight deposited by the standard sample containing no depositing agent gives the depositing factor. From the table below it can be seen that as little as .5% of the depositing agent of this invention per volume of the spray oil more than doubles the amount of its deposit.

| Sample No. of spray oil | Depositing agent | Per cent of depositing agent by volume of oil | Added toxicant in grams per 100 ml. | Depositing factor |
|---|---|---|---|---|
| 1 (standard) | None | None | None | 1 |
| 2 | Penta-erythritol distearate. | .5 | do | 2.84 |
| 3 | do | 1.0 | do | 2.46 |
| 4 | Penta-erythritol tetrastearate. | 1.0 | do | 2.11 |
| 5 | Penta-erythritol distearate. | .5 | .06 rotenone. | 2.08 |

In the above samples no additional emulsifying agent was added to the spray oil and the emulsion was obtained by the emulsifying properties of the depositing agent employed.

I claim as my invention:

1. An insecticidal composition for use in aqueous emulsions comprising spray oil, and between about .01 and 2% by volume of said spray oil of a depositing and emulsifying agent consisting of a carboxylic acid ester of a polyhydroxy alcohol containing at least 3 and not more than 4 hydroxy radicals and having a neo carbon atom, said alcohol being esterified with an acid having 7 or more carbon atoms per molecule.

2. The composition of claim 2 wherein the depositing and emulsifying agent is a carboxylic acid ester of penta-erythritol.

3. An insecticidal composition comprising an insecticide, a mineral spray oil, an aqueous carrier for said insecticide and said oil, and between about .01 and 2% by volume of said oil of a depositing agent consisting of an ester of a polyhydroxy alcohol containing at least 3 and not more than 4 hydroxy radicals and having a neo carbon atom, said alcohol being esterified with an acid having between 12 and 24 carbon atoms per molecule.

4. The composition of claim 3 wherein the depositing and emulsifying agent is penta-erythritol distearate.

5. The composition of claim 3 wherein the depositing and emulsifying agent is penta-erythritol tetrastearate.

6. The composition of claim 3 wherein the depositing and emulsifying agent is penta-erythritol distearate and the percent thereof is between about .1 and about 1.0 by volume of said mineral spray oil.

7. An insecticidal composition, a spray oil, an aqueous carrier therefor, and about .01 to 2% by volume based on the spray oil of a depositing agent consisting of a carboxylic acid ester of an alcohol having a neo carbon atom and being of the general formula:

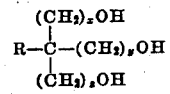

wherein $x$, $y$ and $z$ are integers and R is an organic radical selected from the class consisting of aliphatic, alicyclic, aromatic, and heterocyclic compounds of an aromatic nature, said esterifying acid having at least 7 carbon atoms.

8. A method of increasing the deposition of spray oil on plants from a mixture containing it and an aqueous carrier therefor comprising adding to said spray oil about .01 to 2% by volume of a depositing agent consisting of a carboxylic acid ester of a polyhydroxy alcohol having a neo carbon atom and containing at least 3 and not more than 4 hydroxy radicals, said alcohol being esterified with an acid having 7 or more carbon atoms per molecule, and spraying said mixture on plants.

9. A method of increasing the deposition of spray oil on plants from a mixture containing it and an aqueous carrier therefor comprising adding to said spray oil about .01 to 2% by volume of a depositing and emulsifying agent consisting of a fatty acid ester of penta-erythritol, which latter is esterified with an acid having between 12 and 24 carbon atoms per molecule, and spraying said mixture on plants.

CLIFFORD J. BOISSONOU.

CERTIFICATE OF CORRECTION.

Patent No. 2,369,429. February 13, 1945.

CLIFFORD J. BOISSONOU.

It is hereby certified that error appears in the printed specification of the above numbered patent requiring correction as follows: Page 3, first column, line 13, for the claim reference numeral "2" read --1--; and that the said Letters Patent should be read with this correction therein that the same may conform to the record of the case in the Patent Office.

Signed and sealed this 6th day of November, A. D. 1945.

Leslie Frazer (Seal) First Assistant Commissioner of Patents.